United States Patent
Chasdai

(10) Patent No.: US 12,182,563 B2
(45) Date of Patent: Dec. 31, 2024

(54) FAST IN-SERVICE SOFTWARE UPDATING USING MULTI-LAYER MEMORY

(71) Applicant: MELLANOX TECHNOLOGIES, LTD., Yokneam (IL)

(72) Inventor: Yair Chasdai, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 103 days.

(21) Appl. No.: 18/092,466

(22) Filed: Jan. 3, 2023

(65) Prior Publication Data
US 2024/0220228 A1   Jul. 4, 2024

(51) Int. Cl.
G06F 9/445 (2018.01)
G06F 8/65 (2018.01)
G06F 13/10 (2006.01)

(52) U.S. Cl.
CPC .............. G06F 8/65 (2013.01); G06F 13/105 (2013.01)

(58) Field of Classification Search
CPC ..... G06F 8/65; G06F 8/71; G06F 8/61; G06F 8/60; G06F 11/1433; G06F 3/0679; G06F 16/2379; G06F 3/0683; G06F 13/105
USPC ................................................. 717/168–178
See application file for complete search history.

(56) References Cited

U.S. PATENT DOCUMENTS

| 8,352,932 B2 * | 1/2013 | Cockburn | G06F 8/65 717/170 |
| 10,838,711 B2 | 11/2020 | Haramaty et al. | |
| 2003/0154471 A1 * | 8/2003 | Teachman | G06F 8/65 713/1 |
| 2010/0058316 A1 * | 3/2010 | Ha | G06F 11/1433 717/170 |
| 2022/0245251 A1 | 8/2022 | Sfadia et al. | |

OTHER PUBLICATIONS

Wikipedia, "Cache Placement Policies," pp. 1-8, last edited Sep. 12, 2022.
Nvidia Corporation, "Nvidia NVLink—High-Speed GPU Interconnect", pp. 1-4, year 2022, as downloaded from https://web.archive.org/web/20221201062616/https://www.nvidia.com/en-us/design-visualization/nvlink-bridges/.
Nvidia Corporation, "Nvidia NVLink-C2C—Extending NVLink to Chip-Level Integration", pp. 1-5, year 2022, as downloaded from https://web.archive.org/web/20221206153843/https://www.nvidia.com/en-us/data-center/nvlink-c2c/.
CXL Consortium, "CXL / Compute Express Link: The Breakthrough CPU-to-Device Interconnect", pp. 1-2, year 2022, as downloaded from https://www.computeexpresslink.org/.

\* cited by examiner

*Primary Examiner* — Chuck O Kendall
(74) *Attorney, Agent, or Firm* — MEITAR PATENTS LTD.

(57) ABSTRACT

A peripheral device includes a bus interface, a first processor and a second processor. The bus interface is to communicate over a peripheral bus. The first processor is to manage communication over the peripheral bus by executing bus-maintenance software code, the bus-maintenance software code being executed from one or more first layers of a multi-layer memory. The second processor is to update the bus-maintenance software code from an existing version to an updated version, by (i) loading the updated version to one or more second layers of the multi-layer memory, higher in hierarchy than the one or more first layers, and (ii) invalidating the existing version in the one or more first layers, thereby forcing fetching of the updated version from the one or more second layers to the one or more first layers and to start executing the updated version.

16 Claims, 3 Drawing Sheets

FAST IN-SERVICE SOFTWARE UPDATING USING MULTI-LAYER MEMORY

FIELD OF THE INVENTION

The present invention relates generally to computing and communication systems, and particularly to methods and systems for software updating in peripheral devices.

BACKGROUND OF THE INVENTION

In many electronic systems and devices, it is required to update software in-service, i.e., during normal operation and without resetting the system or device. Various ISSU techniques are known in the art.

For example, U.S. Pat. No. 10,838,711 describes a method and apparatuses for altering the configuration of a system including a processor, firmware storage and a scratchpad from a first configuration in which a first version of firmware enabling a first plurality of system operations is run by the processor, into a second configuration in which a second version of firmware enabling a second plurality of system operations is run by the processor. The disclosed techniques include re-configuring the system from the first configuration into an intermediate configuration, while the system is in the intermediate configuration, disallowing at least one of the first plurality of operations, re-configuring the system from the intermediate configuration to the second configuration, and while the system is in the second configuration, allowing the second plurality of operations.

As another example, U.S. Patent Application Publication 2022/0245251 describes a computer system including a volatile memory and at least one processor. The volatile memory includes a protected storage segment (PSS) configured to store firmware-authentication program code for authenticating firmware of the computer system. The at least one processor is configured to receive a trigger to switch to a given version of the firmware, to obtain, in response to the trigger, a privilege to access the PSS, to authenticate the given version of the firmware by executing the firmware-authentication program code from the PSS, to switch to the given version of the firmware upon successfully authenticating the given version, and to take an alternative action upon failing to authenticate the given version.

SUMMARY OF THE INVENTION

An embodiment of the present invention that is described herein provides a peripheral device including a bus interface, a first processor and a second processor. The bus interface is to communicate over a peripheral bus. The first processor is to manage communication over the peripheral bus by executing bus-maintenance software code, the bus-maintenance software code being executed from one or more first layers of a multi-layer memory. The second processor is to update the bus-maintenance software code from an existing version to an updated version, by (i) loading the updated version to one or more second layers of the multi-layer memory, higher in hierarchy than the one or more first layers, and (ii) invalidating the existing version in the one or more first layers, thereby forcing fetching of the updated version from the one or more second layers to the one or more first layers and to start executing the updated version.

In some embodiments, prior to invalidating the existing version, the second processor is to temporarily prevent the first processor from executing the existing version. In an example embodiment, the second processor is to temporarily prevent the first processor from executing the existing version by instructing the first processor to execute program code that does not belong to the bus-maintenance software code.

In some embodiments, the second processor is to define a mapping between a first region, containing the existing version in the one or more second layers, to a second memory region, containing the updated version in the one or more second layers. In an embodiment, the second processor is to notify the first processor of the mapping, thereby defining for the first processor an address window in the one or more second layers from which the updated version is to be fetched.

In a disclosed embodiment, the one or more first layers include a set-associative cache memory including multiple ways, and, in fetching the updated version from the one or more second layers to the one or more first layers, the second processor is to store the updated version in a single way of the set-associative cache memory.

In an alternative embodiment, the one or more first layers include a set-associative cache memory including multiple ways, and, for fetching the updated version from the one or more second layers to the one or more first layers, the second processor is to store the updated version in two or more of the ways of the set-associative cache memory, and the first processor is to rearrange the updated version in a single way of the set-associative cache memory.

In another embodiment, the second processor is to define the bus-maintenance software code as non-cacheable for the one or more first layers, thereby causing the first processor to execute the updated version directly from the one or more second layers while the second processor is fetching the updated version is being fetched to the one or more first layers.

There is additionally provided, in accordance with an embodiment that is described herein, a method in a peripheral device that communicates over a peripheral bus. The method includes, in a first processor of the peripheral device, managing communication over the peripheral bus by executing bus-maintenance software code, the bus-maintenance software code being executed from one or more first layers of a multi-layer memory. In a second processor of the peripheral device, the bus-maintenance software code is updated from an existing version to an updated version, by (i) loading the updated version to one or more second layers of the multi-layer memory, higher in hierarchy than the one or more first layers, and (ii) invalidating the existing version in the one or more first layers, thereby forcing fetching of the updated version from the one or more second layers to the one or more first layers and to start executing the updated version.

The present invention will be more fully understood from the following detailed description of the embodiments thereof, taken together with the drawings in which:

DETAILED DESCRIPTION OF EMBODIMENTS

Overview

Figure 1:
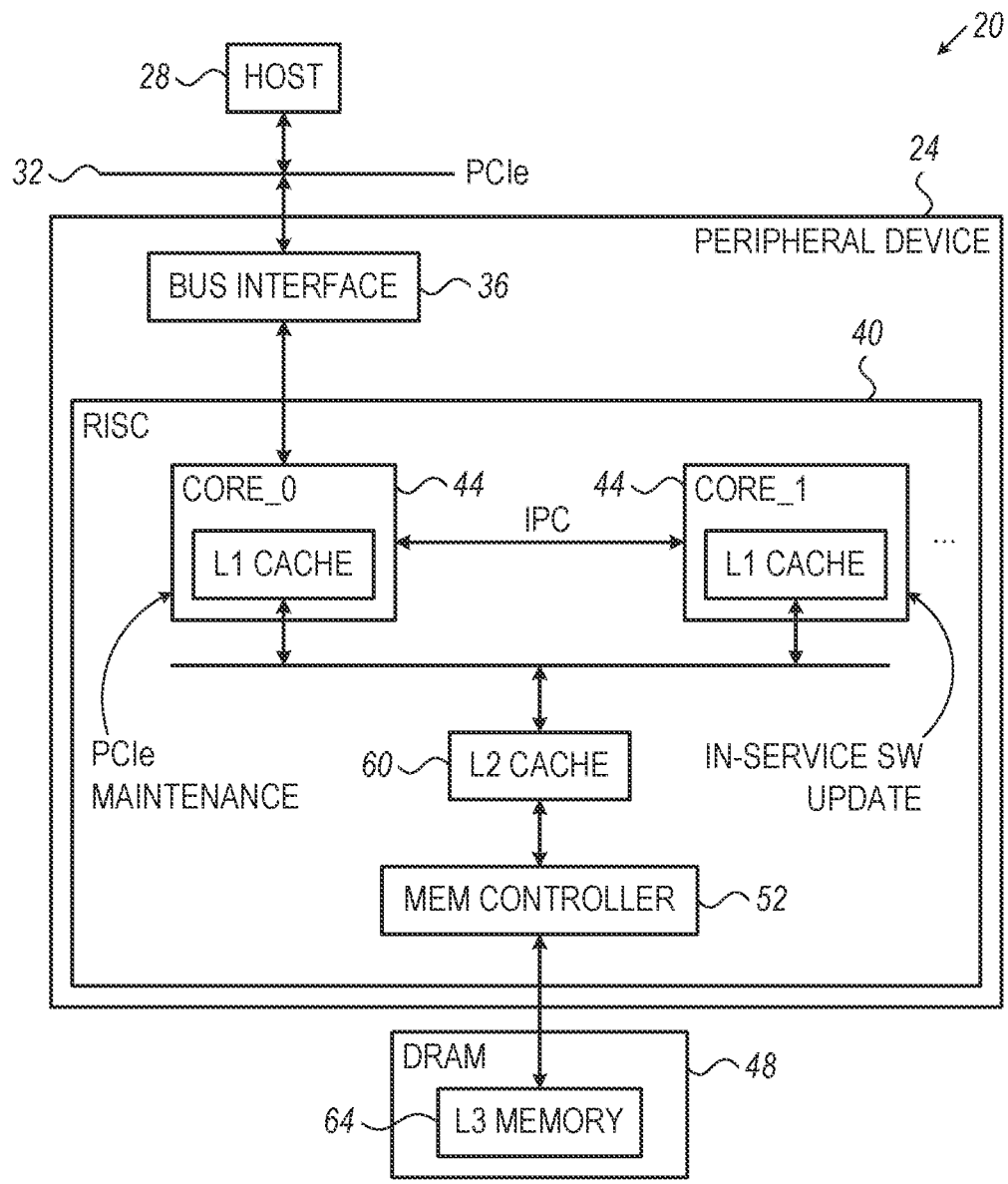
FIG. 1 is a block diagram that schematically illustrates a computing system comprising a peripheral device that supports in-service updating of bus-maintenance software, in accordance with an embodiment of the present invention.

Embodiments of the present invention that are described herein provide improved methods and systems for In-Service Software Update (ISSU) in peripheral devices. A peripheral device may comprise, for example, a network adapter, a network switch, a storage device, or any other type of device that communicates with a host via a peripheral bus. The embodiments described herein refer mainly to the Peripheral Component Interconnect express (PCIe) bus, but the disclosed techniques are applicable to any other suitable peripheral bus, e.g., Compute Express Link (CXL), Nvlink or Nvlink Chip-to-Chip (Nvlink-C2C) buses.

A peripheral device typically runs, among other software components, software code that manages and maintains the bus communication link. This software component is referred to herein as "bus-maintenance software". Tasks carried out by the bus-maintenance software may include, for example:

- configuration of the bus Serializer-Deserializer (SERDES) speed, including throttling the SERDES speed as needed.
- monitoring and reporting errors and other alerts.
- Checking for power events.
- Handling general configuration cycle requests.

Due to its critical role, the bus-maintenance software typically runs on a dedicated processor (e.g., processor core) in the peripheral device, and is required to have minimal down-time. In a PCIe device, for example, the down-time should not exceed fifty microseconds (50 μs). Given such a requirement, updating the bus-maintenance software in-service is extremely challenging.

In some embodiments of the present invention, the peripheral device comprises multiple processors, e.g., multiple cores of a Reduced Instruction Set Computer (RISC). A first core among the cores runs the bus-maintenance software. A second core among the cores is responsible, possibly among other tasks, for updating the bus-maintenance software from an existing version to an updated version. The RISC cores store data and/or software code in a multi-layer memory (also referred to as "multi-level cache"). The second core uses the existing mechanisms of the multi-layer memory to update the bus-maintenance software with very small down-time.

The multi-layer memory comprises multiple memory layers arranged in a hierarchy, with a given layer serving as a cache for the next-lower layer. A higher memory layer typically has more memory space than a lower layer, but on the other hand has larger latency. For example, the lowest memory layer may be on-chip, closely coupled to the processor. Higher memory layers may be off-chip, and may even reside in the host memory, across the peripheral bus.

In a disclosed embodiment, the multi-layer memory comprises three layers denoted L1, L2 and L3. The first processor normally executes the bus-maintenance software from layers L1 and L2, not from L3. L1 is typically fast but small. The bulk of the bus-maintenance software typically resides in L2, and the first processor fetches small portions of the software from L2 to L1 as needed. The latency of L2 is assumed to be small enough to enable real-time execution of the bus-maintenance software.

While the first processor is operating normally, i.e., executing the existing version of the bus-maintenance software from L1 and L2, the second processor loads the updated version to L3. Loading of the updated version (to L3) does not interfere with the execution of the existing version (from L1 and L2). The first processor is typically unaware of the loading operation.

In addition, the second processor maps the L3 memory region containing the updated version to the L2 memory region containing the existing version. The mapping notifies the first processor of the locations in L3 from which the updated version should be fetched in case the existing version is invalid (i.e., in case of "cache miss" in fetching portions of the existing version from L2).

After the updated version has been fully loaded into L3, the second processor temporarily prevents the first processor from executing the existing version. For example, the second processor may divert the first processor to execute an infinite loop from Read-Only Memory (ROM). Then, the second processor invalidates the existing version in L2. From this point, subsequent attempts by the first processor to fetch portions of the bus-maintenance software from L2 will cause "cache miss", thereby forcing fetching of the updated version from L3 to L2. Once fetched from L3 to L2, the updated version replaces the existing version.

By using the disclosed techniques, the existing structure and mechanisms of the multi-layer memory are used to achieve the following:

- Loading of the updated version is performed in parallel with, and does not interfere with, normal operation of the existing version.
- Complete isolation is maintained between the existing version and the updated version.
- Switchover from the existing version to the updated version is extremely fast.

Various implementation examples and variations of the disclosed technique are described herein. For example, in some embodiments L2 is managed as a set-associative cache, as is known in the art, which comprises multiple sets each comprising multiple ways. When fetching the updated version from L3 to L2, the updated version is stored in a single selected way, from among the multiple ways of L2. Storing and executing the bus-maintenance software in a single way enables simpler and more efficient memory management.

Definitions

In the context of the present disclosure and in the claims, the terms "software" and "firmware" are used interchangeably, meaning, for example, that the disclosed techniques are suitable for updating of both software and firmware.

The phrase "updating software from an existing version to an updated version" refers to any desired replacement of one software version by another software version, including but not limited to software upgrading and software downgrading.

In the context of the present disclosure and in the claims, the terms "multi-layer memory" and "multi-level cache" are also used interchangeably, and so are the terms "memory layer" and "cache level".

System Description

FIG. 1 is a block diagram that schematically illustrates a computing system 20 comprising a peripheral device 24 that supports in-service updating of bus-maintenance software, in accordance with an embodiment of the present invention. System 20 may comprise, for example, a server in a data center or in another computer cluster or network, a standalone computer or workstation, or any other suitable computing system.

In various embodiments, peripheral device 24 may comprise, for example, a network adapter (e.g., a Network Interface Controller (NIC), a Host Channel Adapter (HCA), a Data Processing Unit (DPU), also referred to as "SmartNIC", or a network-enabled Graphics Processing Unit (GPU)), a network switch, a storage device such as a Solid State Drive (SSD), or any other type of device that communicates with a host via a peripheral bus. In the present example, peripheral device 24 is connected to a host 28 via a PCIe bus 32. In alternative embodiments, the peripheral bus may comprise any other suitable bus type, such as CXL, Nvlink or Nvlink-C2C.

Peripheral device 24 comprises a bus interface 36 for communicating over PCIe bus 32, a RISC 40 comprising multiple RISC cores 44, and a memory 48. In the present example memory 48 is a Dynamic Random Access Memory (DRAM). RISC cores 44 are also referred to as "cores" or "processors". In alternative embodiments, any other suitable types of processors and memories can be used.

In the embodiment of FIG. 1, one of cores 44 (a core denoted CORE_0) is dedicated for executing PCIe link maintenance software (which is considered an example of bus-maintenance software). Another core 44 (a core denoted CORE_1) is responsible (possibly among other tasks) for updating the PCIe link maintenance software of CORE_0 from an existing version to an updated version, using ISSU techniques that are described herein. CORE_0 and CORE_1 are connected to one another by an Inter-Process Communication (IPC) link.

Computing system 20 further comprises a multi-layer memory comprising a plurality of memory layers. In the present example the multi-level memory comprises layer-1 (L1) caches 56, a Layer-2 (L2) cache 60 and a Layer-3 (L3) memory 64. L1 caches 56 comprise on-chip memories that are closely coupled to respective cores 44. L2 cache 60 is internal to RISC 40 but shared among cores 44. L3 memory resides in DRAM 48. RISC 40 further comprises a memory controller 52 that manages access to memory layers external to the RISC.

The multi-level memory configuration depicted in FIG. 1 is an example configuration that is chosen purely for the sake of conceptual clarity. In alternative embodiments, any other suitable multi-layer memory configuration can be used. For example, the number of layers can be smaller or larger than three. A given memory layer may reside in any suitable location. In one alternative embodiment not seen in FIG. 1, one or more memory layers may reside in a memory of host 28, meaning that access to such layers requires communication over PCIe bus 32.

As another example, RISC 40 need not necessarily comprise a memory controller 52. In one alternative embodiment, mapping between L3 and L2 is carried out by L2 cache 60, in which case the relevant L3 memory devices are typically connected to L2 cache 60 directly. In another embodiment, memory controller 52 is embedded in L2 cache 60.

The multiple memory layers are arranged in a hierarchy, in which each layer (except L1) serves as a cache for the next-lower layer. Thus, for example, when a certain core 44 needs to access a certain memory address, the core first checks whether the corresponding data item (which may comprise data or program code) exists (and is valid) in its L1 cache 56. If so (an event referred to as "cache hit"), core 44 uses the locally cached data item. If not (an event referred to as "cache miss"), the L1 cache checks whether the requested data item exists (and is valid) in the next-higher layer—L2 cache 60. A similar process is conducted between L2 and L3, with the assistance of memory controller 52.

The configurations of system 20 and peripheral device 24, as depicted in FIG. 1, are example configurations that are chosen purely for the sake of conceptual clarity. Any other suitable configurations can be used in alternative embodiments.

In various embodiments, peripheral device 24 may be implemented using suitable software, using suitable hardware such as one or more Application-Specific Integrated Circuits (ASIC) or Field-Programmable Gate Arrays (FPGA), or using a combination of hardware and software. Some elements of peripheral device 24, e.g., RISC 40, may be implemented using one more general-purpose processors, which are programmed in software to carry out the techniques described herein. The software may be downloaded to the processors in electronic form, over a network, for example, or it may, alternatively or additionally, be provided and/or stored on non-transitory tangible media, such as magnetic, optical, or electronic memory.

Issu Using Multi-Level Memory

Figure 2:
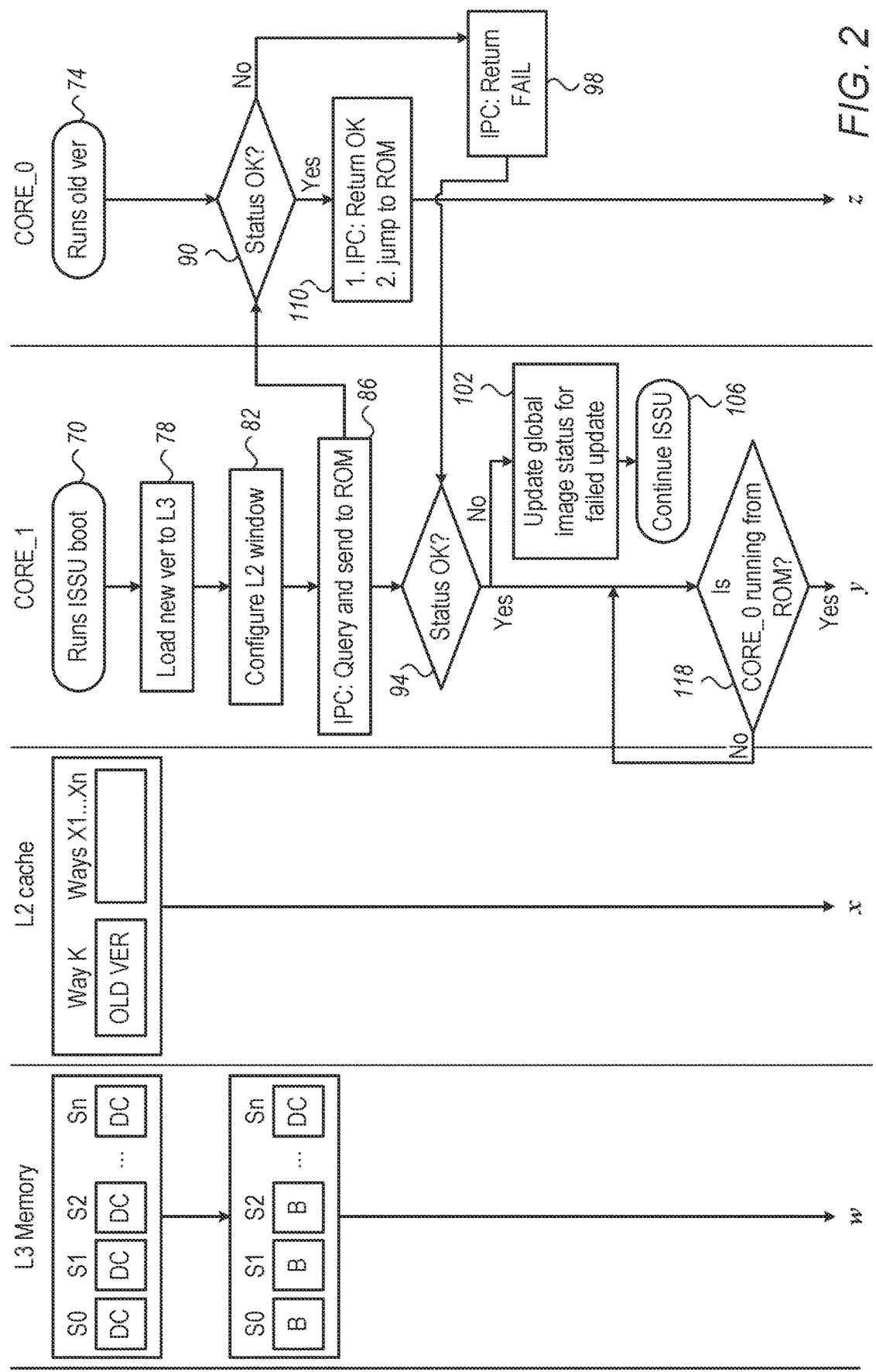
FIG. 2 is a diagram that schematically illustrates a method for in-service updating of bus-maintenance software, in accordance with an embodiment of the present invention.
Figure 2:
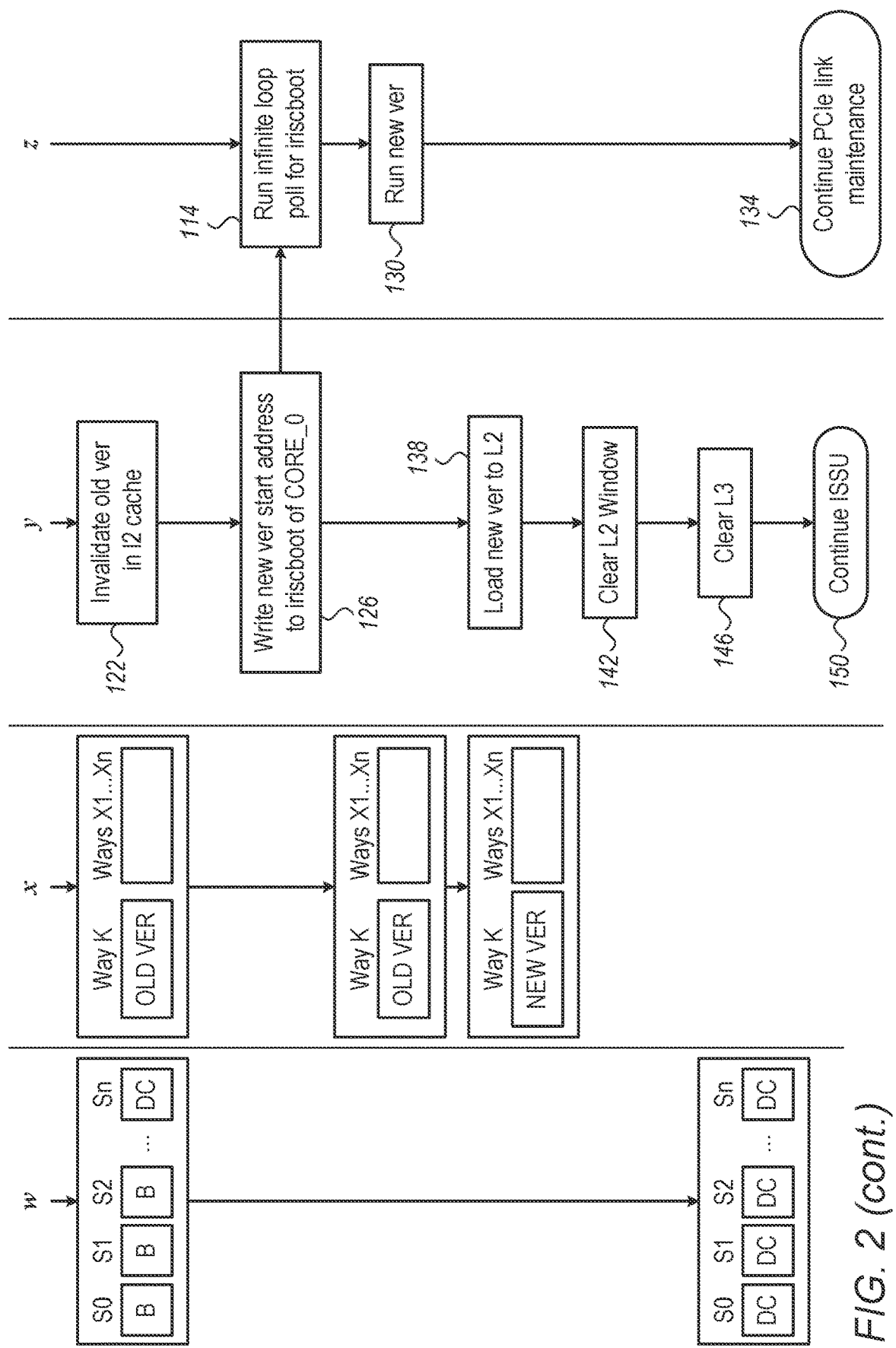

FIG. 2 is a diagram that schematically illustrates a method for in-service updating of bus-maintenance software, in accordance with an embodiment of the present invention. FIG. 2 has four columns. The two right-hand-side columns contain a flow chart that illustrates the method from the perspectives of CORE_1 and CORE_0. The two left-hand-side columns show the status of L3 memory 64 and L2 cache 60 at each stage of the method.

In the present example, L3 memory 64 comprises multiple Static RAM (SRAM) devices denoted S0, S1, . . . , Sn. L2 cache 60 is managed as a set-associative cache. A set-associative cache comprises multiple entries referred to as sets, with each set comprising multiple entries referred to as ways. As seen in the figure, in the present example the bus-maintenance software is not distributed across the various ways, but rather stored in a single way (denoted "Way K"). Storing the bus-maintenance software in a single way simplifies the L2 cache management, simplifies the hardware design, and also improves cache lookup performance.

The method of FIG. 2 begins with CORE_1 running ISSU boot code, at a boot initialization stage 70, and CORE_0 running the existing version of the bus-maintenance software (denoted "old ver" in the figure), at an old version execution stage 74. At this stage, the L2 cache comprises the old version, and the L3 memory comprises some unrelated data ("Don't Care" data, denoted "DC").

At an L3 loading stage 78, CORE_1 loads the updated version of the bus-maintenance software (denoted "new ver" in the figure) to L3 memory 64. The loaded new version is denoted "B" on the left-most column. Loading the bus-maintenance software to L3 is typically a long operation, e.g., on the order of several milliseconds (long in comparison with the permitted down-time of the bus-maintenance software, which is on the order of fifty microseconds). This long duration, however, does not affect the down-time of CORE_0, which in the meantime executes the existing version without interruption.

At an L2 window configuration stage 82, CORE_1 defines a mapping (referred to as "L2 window") between (i) the address range in L3 containing the updated version and (ii) the address range in L2 containing the existing version. CORE_1 notifies CORE_0 of the mapping. The mapping specifies the addresses in the L3 memory from which CORE_0 should fetch the updated version in case the existing version is invalid in the L2 cache.

At an IPC messaging stage 86, CORE_1 sends a message over the IPC link to CORE_0. The message (i) queries the status of CORE_0, and (ii) instructs CORE_0 to stop executing the existing version and jump to execute an infinite loop from ROM. The status query ensures that the software update process will be performed only if CORE_0 is fully functional. The diversion to ROM ensures that CORE_0 will not access L2 while software update is in progress. In alternative embodiments, CORE_1 may divert CORE_0 to execute any other loop or code that does not belong to the bus-maintenance software. Further alternatively, CORE_1 may use any other technique for temporarily preventing CORE_0 from executing the existing version.

In response to IPC message, CORE_0 checks its internal status, at a status checking stage 90. The status check may include, for example, verifying that all Finite State Machines (FSMs) of CORE_0 are functioning correctly. The status check may return an "OK" result or a "FAIL" result. At a status checking stage 94, CORE_1 checks the reported status of CORE_0.

If the internal status of CORE_0 is "FAIL", CORE_0 reports this status to CORE_1 over the IPC link, at a failure reporting stage 98. In response, CORE_1 updates the global image status of the failure in updating the bus-maintenance software, at a failure updating stage 102. CORE_1 then continues with ISSU of other software components, at an ISSU proceeding stage 106.

If the outcome of status checking stage 90 is that the internal status of CORE_0 is "OK", CORE_0 reports this status to CORE_1 over the IPC link, at a success reporting stage 110, and jumps to run from ROM as instructed. At a loop execution stage 114, CORE_0 (i) executes the infinite loop from ROM, and (ii) polls a register denoted "iriscboot". This register will eventually contain the start address (in L3) of the new version of the bus-maintenance software.

Reference is now made back to CORE_1. At a ROM checking stage 118, CORE_1 proceeds to check whether CORE_0 began running from ROM as instructed. Upon verifying that CORE_0 is running from ROM, CORE_1 invalidates the old version of the bus-maintenance software in the L2 cache, at an L2 invalidation stage 122. Then, at a start address reporting stage 126, CORE_1 writes the start address of the new version (in the L3 memory) to register "iriscboot" of CORE_0.

Following the invalidation of the old version (stage 122), when CORE_0 attempts to fetch a portion of the old version from L2 to L1, the attempt results in "cache miss". As a result, the new version is loaded to Way K of L2 cache 60, at an L2 loading stage 138. As seen in the figure, the old version has now been replaced with the new version in Way K of L2 cache 60.

In some embodiments, stage 130 (in CORE_0) and stage 138 (in CORE_1) are performed in parallel. At stage 130, CORE_0 executes the new version directly from L3 memory 64. In parallel, CORE_1 loads the same new version from L3 memory 64 to Way K of L2 cache 60. In one embodiment, such parallel operation is enabled by CORE_1 defining the bus maintenance software as "non-cacheable for L2" (when this feature is supported by the memory system). This setting ensures that the bus maintenance software will be fetched directly from L3 to L1 for execution, without being cached in L2. In another embodiment (e.g., when the memory system does not support a "non-cacheable for L2" setting), L2 cache 60 will cache the bus maintenance software that is fetched by CORE_0 from L3 memory 64. In this embodiment, however, the software will not necessarily be cached in a single way (Way K). CORE_1 will typically have to later rearrange the software in Way K.

From this point, CORE_0 starts running the new version of the bus-maintenance software, at a new version execution stage 130. Core_0 thus continues normal maintenance of the PCIe link using the new version, at a maintenance resumption stage 134. The entire process of replacing the old version by the new version has been performed without resetting CORE_0.

At this stage, the mapping ("L2 window") defined at stage 82 is irrelevant, and so is the content of the corresponding memory region in L3. Core_1 therefore clears the mapping, at a window clearing stage 142, and the corresponding memory region in L3, at an L3 clearing stage 146. CORE_1 then continues ISSU of other software components, at an ISSU proceeding stage 150.

The flow shown in FIG. 2 is an example flow that is chosen purely for the sake of conceptual clarity. In alternative embodiments, any other suitable flow can be used. For example, querying the status of CORE_0 before starting the updating process is not mandatory and may be omitted in some embodiments, Although the embodiments described herein mainly address updating of bus-maintenance software in peripheral devices, the methods and systems described herein can also be used in other applications, such as in in-service updating of other types of software, particularly real-time software that is required to comply with a fast response cycle.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A peripheral device, comprising:
   a bus interface, to communicate over a peripheral bus; and
   a first processor and a second processor, both to access a multi-layer memory comprising multiple layers arranged in a hierarchy, the layers comprising at least (i) one or more first layers and (ii) one or more second layers that are higher in the hierarchy than the one or more first layers and serve as a cache for the one or more first layers,
   wherein the first processor is to manage communication over the peripheral bus by executing bus-maintenance software code, the bus-maintenance software code being executed from the one or more first layers of the multi-layer memory; and
   wherein the second processor is to update the bus-maintenance software code from an existing version to an updated version, by:
      loading the updated version to the one or more second layers of the multi-layer memory; and invalidating the existing version in the one or more first layers, thereby causing a subsequent attempt to read the existing version from the one or more first layers to result in a cache-miss event and thus forcing the second processor to fetch the updated version from the one or more second layers to the one or more first layers and to start executing the updated version.

2. The peripheral device according to claim 1, wherein, prior to invalidating the existing version, the second processor is to temporarily prevent the first processor from executing the existing version.

3. The peripheral device according to claim 2, wherein the second processor is to temporarily prevent the first processor from executing the existing version by instructing the first processor to execute program code that does not belong to the bus-maintenance software code.

4. The peripheral device according to claim 1, wherein the second processor is to define a mapping between a first region, containing the existing version in the one or more second layers, and a second memory region, containing the updated version in the one or more second layers.

5. The peripheral device according to claim 4, wherein the second processor is to notify the first processor of the mapping, thereby defining for the first processor an address window in the one or more second layers from which the updated version is to be fetched.

6. The peripheral device according to claim 1, wherein the one or more first layers comprise a set-associative cache memory comprising multiple ways, and wherein, in fetching the updated version from the one or more second layers to the one or more first layers, the second processor is to store the updated version in a single way of the set-associative cache memory.

7. The peripheral device according to claim 1, wherein the one or more first layers comprise a set-associative cache memory comprising multiple ways, and wherein, for fetching the updated version from the one or more second layers to the one or more first layers, the second processor is to store the updated version in two or more of the ways of the set-associative cache memory, and the first processor is to rearrange the updated version in a single way of the set-associative cache memory.

8. The peripheral device according to claim 1, wherein the second processor is to define the bus-maintenance software code as non-cacheable for the one or more first layers, thereby causing the first processor to execute the updated version directly from the one or more second layers while the second processor is fetching the updated version to the one or more first layers.

9. A method in a peripheral device that communicates over a peripheral bus, the method comprising:

accessing a multi-layer memory by a first processor and a second processor of the peripheral device, the multi-layer memory comprising multiple layers arranged in a hierarchy, the layers comprising at least (i) one or more first layers and (ii) one or more second layers that are higher in the hierarchy than the one or more first layers and serve as a cache for the one or more first layers, in the first processor, managing communication over the peripheral bus by executing bus-maintenance software code, the bus-maintenance software code being executed from the one or more first layers of a multi-layer memory; and in the second processor, updating the bus-maintenance software code from an existing version to an updated version, by:

loading the updated version to the one or more second layers of the multi-layer memory; and invalidating the existing version in the one or more first layers, thereby causing a subsequent attempt to read the existing version from the one or more first layers to result in a cache-miss event and thus forcing the second processor to fetch the updated version from the one or more second layers to the one or more first layers and to start executing the updated version.

10. The method according to claim 9, further comprising, using the second processor, prior to invalidating the existing version, temporarily preventing the first processor from executing the existing version.

11. The method according to claim 10, wherein temporarily preventing the first processor from executing the existing version comprises instructing the first processor to execute program code that does not belong to the bus-maintenance software code.

12. The method according to claim 9, further comprising defining, by the second processor, a mapping between a first region, containing the existing version in the one or more second layers, and a second memory region, containing the updated version in the one or more second layers.

13. The method according to claim 12, wherein defining the mapping comprises notifying the first processor of the mapping, thereby defining for the first processor an address window in the one or more second layers from which the updated version is to be fetched.

14. The method according to claim 9, wherein the one or more first layers comprise a set-associative cache memory comprising multiple ways, and wherein fetching the updated version from the one or more second layers to the one or more first layers comprises storing the updated version in a single way of the set-associative cache memory.

15. The method according to claim 9, wherein the one or more first layers comprise a set-associative cache memory comprising multiple ways, and wherein fetching the updated version from the one or more second layers to the one or more first layers comprises storing the updated version in two or more of the ways of the set-associative cache memory, and subsequently rearranging the updated version in a single way of the set-associative cache memory.

16. The method according to claim 9, further comprising defining the bus-maintenance software code as non-cacheable for the one or more first layers, thereby causing the first processor to execute the updated version directly from the one or more second layers while the second processor is fetching the updated version to the one or more first layers.

* * * * *